June 4, 1968  W. E. JACOBSON  3,386,282
TEMPERATURE RESPONSIVE DEVICE
Filed April 15, 1966
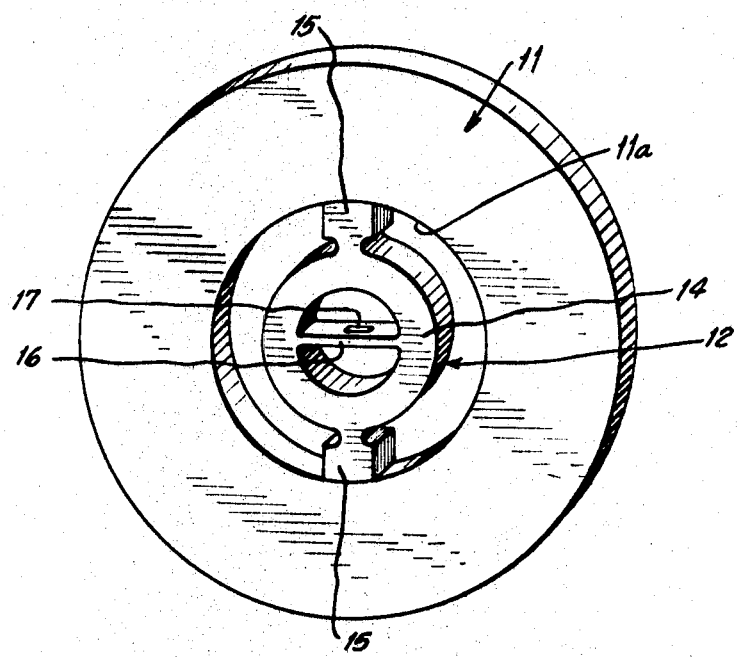
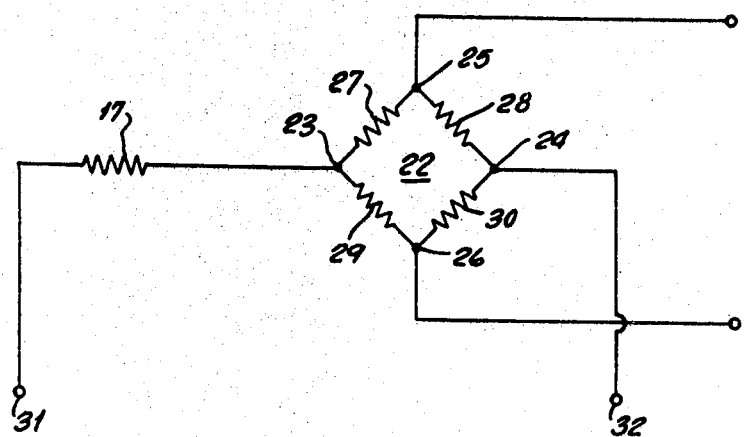
INVENTOR
WALTER E. JACOBSON
BY
Lester N. Clark
ATTORNEY United States Patent Office 3,386,282
Patented June 4, 1968

3,386,282
TEMPERATURE RESPONSIVE DEVICE
Walter E. Jacobson, Meriden, Conn., assignor to Revere Corporation of America, County of New Haven, Conn., a corporation of New Jersey
Filed Apr. 15, 1966, Ser. No. 546,125
6 Claims. (Cl. 73—88.5)

This invention relates to a temperature-sensing device. More particularly, this invention relates to arrangements for compensating electrically sensitive apparatus for the changes in the resistance of electrical elements with changes in temperature. The invention is particularly useful as a device for compensating a load cell for temperature changes, and is so described herein. This invention is illustrated as a novel structure supporting a semiconductor strain gage, the structure and the strain gage constituting a temperature responsive element having a linear relationship between temperature and an electrical characteristic of the element.

As is well known, a resistance strain gage is an element of conductive material having an electrical resistance that varies with the strain imposed upon the gage. The resistance of a conductive material suitable for such gages also varies with the temperature to which it is exposed. The prior art has attempted to overcome this difficulty either by keeping the gage at a constant local temperature irrespective of variations in the ambient temperature, by calibration of the gage at different temperatures and introducing a calibration connection into the gage output, or by utilization with the strain gage of a compensating element subject to the same ambient temperature and effective to produce a change in the electrical output with temperature opposite to the change produced in response to temperature by the gage itself, so that the two temperature effects cancel.

Previous attempts to meet the problem have not been completely satisfactory. For example, attempting to maintain the gage at constant temperature requires additional equipment, such as a thermostat and a heater or cooler, and results in a bulky package of elements; calibration and correction requires either trained personnel or complex apparatus, and may result in substantial error under the conditions of actual operation; finally, the compensating elements of the prior art have been subject to error except in a very narrow range of temperature variation.

It is common to measure strain with such gages by wiring them into a Wheatstone bridge circuit. The strain gages are commonly fastened to a supporting structure, whose strain is to be measured, by means of a bonding medium effective to transfer all movements of the structure to the gages, so that the dimensions and hence the resistance of the gages is determined by the strain on the structure. The strain may be either compressive or tensile, and in either case, depending on the characteristics of the gage material, may cause either an increase or decrease in the resistance. The sensitivity of an electrical strain gage is commonly described by the use of a gage factor GF, defined as:

$$GF = \frac{\frac{\Delta R}{R}}{\Delta e}$$

in which $GF$=the gage factor, $R$=electrical resistance of the unstrained element, $\Delta R$=change in resistance associated with the change in the strain, $\Delta e$.

Semiconductor gages are available having either a positive or a negative gage factor. Typically, four gages are bonded to the structure so that, in response to a particular load, the resistances of the two of the gages increase, and the resistances of the other two gages decrease.

These gages are connected in a Wheatstone bridge so that the adjacent arms will respond to a strain in a given sense by changing their resistances in opposite directions. This will create a change in the potential (output signal) across two corners of the bridge circuit provided a constant input potential across the two other corners of the bridge is maintained.

It is desirable to maintain the above relationships between strain and resistance to precise values through wide ranges of temperature. Commonly an increase in ambient temperature causes a reduction in gage factor of a semiconductor strain gage. Because of this reduction in gage factor, the magnitude of the output signal will be reduced for a given applied force on a structure, when an input voltage is held constant.

To correct this condition, it is common to use a compensating resistance element such as a thermistor, having a negative temperature coefficient of resistance, in series with the input leads to the bridge circuit. This compensating element is subjected to the same ambient temperature as the strain gage elements. When the gage element is subjected to an increase in temperature, thereby reducing the gage factor, the same temperature increase results in a lowering of the resistance of the compensating element. The resulting decrease in the potential drop across the thermistor creates an increase in the input potential. The output potential of a bridge circuit for a given condition of unbalance, is proportional to the input potential and therefore by increasing the input potential at the bridge circuit the output potential will increase correspondingly. This increase in the output potential will correct for the reduction in output potential which results from the reduction in gage factor of the gages.

Conventional thermistors can be used as compensating elements to accomplish the function required. However, they are only effective over a limited temperature range, such as from 50° F. to 150° F. in the typical situation. The present invention extends the effective temperature range beyond the limits of a carbon or semiconductor thermistor, and permits operation at both higher and lower temperatures.

It is an object of this invention to provide an improved temperature-sensing device. It is another object of this invention to provide improved means for compensating for the changes in the resistance of electrical elements with changes in temperature. A further object of this invention is to provide compensation for a substantial range of temperature variations occurring in the measurement of strains resulting from an inruced force on a structure.

The foregoing and other objects of the invention are attained in the apparatus described herein, which includes, in combination, as strain responsive electrical element and a novel mounting means therefor which strains the element as a function of temperature and therefore produces an electrical output which varies with temperature. This element is mounted upon a diametrical strut extending across a ring, said ring having diametrically opposed external protrusions located at right angles relative to such strut and being of material having a substantial temperature coefficient of expansion. This ring is interference fitted within, or joined to the inner surface of, an outer annular ring so as to apply an initial strain. The outer ring is of material having a substantially lower temperature coefficient of expansion. A change in temperature thus causes strain in the two rings because of their different coefficients of expansion. This strain changes the resistance of the electrical element so as to indicate the change in temperature. Alternatively, the apparatus may be used to compensate either the same resistance element or other resistance elements for changes in resistance due to the change in temperature.

In the drawings:

FIG. 1 is a perspective view of a temperature responsive device constructed in accordance with the invention; and FIG. 2 is a wiring diagram of a Wheatstone bridge circuit in which the electrical element in the device of FIG. 1 may be connected.

Referring to FIG. 1, there is shown an annulus 11 which may be formed of a material with a very low temperature coefficient of expansion (e.g., Invar). The annulus 11 encircles an opening 11a. A bridge element 12 is disposed within and extends across the opening 11a and comprises a ring 14 with an outer diameter substantially smaller than the diameter of opening 11a, two diametrically opposed external protrusions 15, and a diametrical strut 16 disposed within and extending across the ring 14 and displaced 90° relative to the protrusions 15. Bridge element 12 may be formed of a material with a relatively high temperature coefficient of expansion (e.g., aluminum).

The annulus 11 may be pressed over the two protrusions 15 creating an interference fit between the bridge element 12 at the protrusions and the element 11. Alternatively, the protrusions of bridge element 12 may be attached to the interior surface of the opening 11a, such as by welding, soldering, bolting, bonding or similar processes. Any such method of engaging the annulus 11 and the bridge element 12 should be carried out so as to create a strain in both the annulus and in the bridge. The bridge is stressed in compression, and that stress tends to force the ring 14 into an elliptical configuration in which the horizontal diameter, as it appears in FIG. 1, is extended. The strut 16 is thereby stressed in tension.

When subjecting the assembly illustrated in FIG. 1 to an increase in temperature the outer ring will restrain the inner ring from expanding at its natural rate, thus causing elastic deformation in the inner ring where the web portion will increase its strain in tension. Conversely subjecting the assembly to a decrease in temperature the reductiton in its prestrain state will occur in a greater magnitude than it would have in its natural state.

On the surface of the web are bonded one or more strain gages 17. The resistance of the strain gage element 17 mounted on the strut 16 is determined by the ambient temperature and by the initial stress on the strut 16, at the time the bridge element 12 is fitted inside the ring 11.

Any increase in temperature to which the unit is subjected has the effect of increasing the tension and hence the strain in the strut 16. Thus the resistance of the strain gage 17 is changed not only due to its temperature coefficient of resistance, but also due to the added strain to which it is subjected.

On the other hand, a decrease in the ambient temperature decreases the strain in the strut 16, and again changes the resistance of the strain gage 17 not only because of the temperature coefficient of resistance of that element, but also because of the change in the strain.

Depending upon the selection of the material of the strain gage 17, the change in resistance due to the strain may either add or subtract from the change in resistance due to the temperature coefficient of resistance of the same gage. Since a principal object of the invention is to devise a structure which will produce a greater change in resistance for a given change in temperature than in the temperature sensitive elements of the prior art, the material will normally be selected so that the change in resistance due to a change in strain occasioned by a change in temperature will add to the change in resistance due to the temperature coefficient of resistance of the particular material involved. For example, a P-type semiconductor has a positive temperature coefficient of resistance and also has a positive gage factor so that both resistance changes are additive and produce a considerably greater change in resistance in response to a given change in temperature. On the other hand, N-type semiconductor material has a negative gage factor which is usually substantially greater than its positive temperature of coefficient of resistance. The positive change due to the temperature coefficient of resistance will buck against the change due to the negative gage factor. It may nevertheless be desirable to use N-type semiconductive material having a negative gage factor and a positive temperature coefficient if the combination produces a particular desired sensitivity of the complete unit.

Although this device can be used as a temperature sensor by itself in terms of relating resistance with temperature, it may also be used to compensate a strain gage pressure or force transducer, as described below.

FIG. 2

There is shown in FIG. 2 an electrical wiring diagram of a circuit utilizing the strain gage element 17 of FIG. 1 to compensate the output of a load cell bridge and for variations in ambient temperature. The bridge 22 has input terminals 23 and 24 and output terminals 25 and 26. Bridge arms 27, 28, 29 and 30 connect each input terminal to each of the output terminals. The particular load cell structure is not material to the present invention. For example, the load cell may be one of those shown and claimed in my application Serial No. 333,013 filed December 24, 1963.

The compensating resistance element 17 is connected in series between a source of power supply connected to terminals 31 and 32 and the input terminals 23 and 24 of the bridge 22. This particular manner of connecting a compensating resistance element is itself old in the art and does not form part of the present invention. In the use of this circuit, the strain sensitive elements 27, 28, 29 and 30 in the bridge 22 would be subjected to the same ambient temperature as the compensating element 17. The characteristics of the element 17 would be designed, for proper selection of the materials of the annulus 11, the bridge element 12 and the strain gage element 17, so that errors introduced into the output of the bridge 22 by changes in temperature would be compensated by changes in the resistance of strain gage 17, so that the net change in the output due to a change in ambient temperature would be reduced substantially to zero.

The compensating characteristics of the gage element 17 may also be varied by controlling the temperature at which the bridge element 12 is engaged inside the annulus 11 and by controlling the relative dimension of those parts at the time the force fitting is made. By virtue of the engagement, the compensating element 17 responds not only to increases in temperature above that at which the engagement is made but also to decreases in temperature. By proper selection of the variables, which may be controlled, the compensating element 17 may be arranged to compensate the bridge circuit 22 in a substantially complete and accurate manner over a very wide temperature range. For example, a range from 32° F. to 275° F. has been attained.

Though the explanation of the invention has been based on the use of a semiconductor strain gage having a negative gage factor, it can readily be seen that the opposite effect can be produced through the use of a semiconductor strain gage which has a positive gage factor. Therefore, a positive or negative type gage may be selected depending on the polarity of the temperature coefficient of the element being compensated or the relative location in the overall circuit of the device of the invention and the device being compensated.

While only a single embodiment of the present invention has been illustrated, it will be apparent to those skilled in the art that modifications, alterations and substitutions are possible in the practice of this invention without departing from the scope thereof.

I claim:

1. A mounting for a strain sensitive element comprising (a) an inner ring of a material having a substantial temperature coefficient of expansion and having diametrically opposed external protrusions; (b) an outer ring of a material having a substantially lower temperature coefficient of expansion engaging said protrusions so as to stress both said rings; and (c) said inner ring being adapted to carry said strain sensitive element to that said element is subjected to strain variations corresponding to variations in the ambient temperature.

2. A mounting for a strain sensitive element as defined in claim 1 wherein said inner ring carries only one pair of external protrusions.

3. A mounting for a strain sensitive element as defined in claim 2 wherein the inner ring carries an internal diametrical strut to which said strain sensitive element is bonded.

4. A mounting for a strain sensitive element as defined in claim 3 wherein said diametrical strut is disposed at 90° relative to said external protrusions.

5. A temperature responsive device comprising (a) an inner annular ring of a material having a substantial temperature coefficient of expansion and having a pair of diametrically opposed external protrusions; (b) an outer annular ring of a material having a substantially lower temperature coefficient of expansion engaging said protrusions so as to stress both said rings; and (c) said inner ring carrying an internal diametrical strut at 90° relative to said protrusions, and a strain sensitive electrical element bonded to said diametrical strut and electrical connections to said strain sensitive element.

6. An electrical circuit responsive to variations in a variable condition and compensated for variations in ambient temperature, comprising:

(a) a bridge circuit responsive to said variable condition, said bridge circuit including:
   (1) a pair of input terminals;
   (2) a pair of output terminals; and
   (3) arms interconnecting said input and output terminals, at least one arm including a variable resistance element responsive to said condition and also responsive to variations in ambient temperature;

(b) a compensating resistance element;

(c) means connecting said element in series with one of said input terminals, said connecting means and the other input terminal being adapted for connection to a source of electrical energy; and (d) mounting means for said resistance element, including:
   (1) an inner ring of a material having a substantial temperature coefficient of expansion and having diametrically opposed external protrusions;
   (2) an outer ring of a material having a substantially lower temperature coefficient of expansion engaging said protrusions so as to stress both said rings; and
   (3) said inner ring being adapted to carry said compensating resistance element so that said element is subjected to strain variations corresponding to variations in the ambient temperature.

References Cited

UNITED STATES PATENTS

| | | | |
|---|---|---|---|
| 2,600,701 | 10/1949 | Statham et al | 73—141 X |
| 3,228,240 | 1/1966 | Ormond | 73—141 |
| 3,309,921 | 3/1967 | Eckard et al. | 73—141 |

JOHN F. COUCH, *Primary Examiner.*

W. E. RAY, *Examiner.*